United States Patent [19]

Balcombe

[11] 4,031,931
[45] June 28, 1977

[54] MORTISING MACHINE

[75] Inventor: Barry Vivian Balcombe, Cloverdale, Australia

[73] Assignee: Louisa Mary Balcombe, Cloverdale, Australia

[22] Filed: Nov. 12, 1975

[21] Appl. No.: 631,392

[52] U.S. Cl. .................................. 144/83; 90/12 R; 144/70; 144/136 R
[51] Int. Cl.[2] .......................................... B27F 5/00
[58] Field of Search ............ 144/136 R, 27, 82, 69, 144/70, 73, 79, 134 R, 83, 84; 90/12 R, 15 R, DIG. 3, DIG. 14, DIG. 15, DIG. 16

[56] References Cited

UNITED STATES PATENTS

| 1,580,412 | 4/1926 | Collins | 144/79 |
| 1,718,324 | 6/1929 | Wappat | 144/70 |
| 1,738,227 | 12/1929 | Carter | 144/70 |
| 2,629,411 | 2/1953 | Jones | 144/79 X |
| 3,301,288 | 1/1967 | Norlie et al. | 144/69 X |

*Primary Examiner*—Othell M. Simpson
*Assistant Examiner*—W. D. Bray

[57] ABSTRACT

A mortising machine comprising a clamping means whereby the machine may be mounted upon a workpiece; a drive motor mounted such that its drive shaft is substantially perpendicular to the working face of the workpiece; a cutting head mounted to the end of the drive shaft adjacent the workface; and a support means to support the drive shaft between the drive motor and the cutting head. The support means also provides support for the drive motor, the drive shaft and the drive motor being slidably mounted to the support means to be movable perpendicular to the workface. There are feeding means between the support means and the motor such that the drive shaft can be fed through the support means; and a guide is mounted to the clamping means to which the support means is slidably mounted such that the support means together with the drive shaft are capable of movement on the guide perpendicular to that produced by the feed means.

7 Claims, 5 Drawing Figures

MORTISING MACHINE

This invention relates to a mortising machine for the purpose of forming a mortise in a workpiece.

It is an object of the invention to provide a mortising machine which may form a mortise quickly and accurately.

In one form the invention resides in a mortising machine comprising; a clamping means whereby the machine may be mounted upon a workpiece; a drive motor mounted such that its drive shaft is substantially perpendicular to the working face of the workpiece; a cutting head mounted to the end of the drive shaft adjacent the workface; a support means to support the drive shaft between drive motor and the cutting head, the support means also providing support for the drive motor, the drive shaft and drive motor being slidably mounted to the support means to provide for sliding movement on the support means perpendicular to the workface; feeding means between said support means and motor such that the drive shaft can be fed through said support means; and a guide mounted to the clamping means to which the support means is slidably mounted such that the support means together with the drive motor and drive shaft are capable of movement on the guide perpendicular to that produced by the feed means.

The invention will be more fully understood in the light of the following description of one specific embodiment. The description is made with reference to the accompanying drawings of which FIG. 1 is a perspective view of preferred exemplary embodiment;

Figure 1:
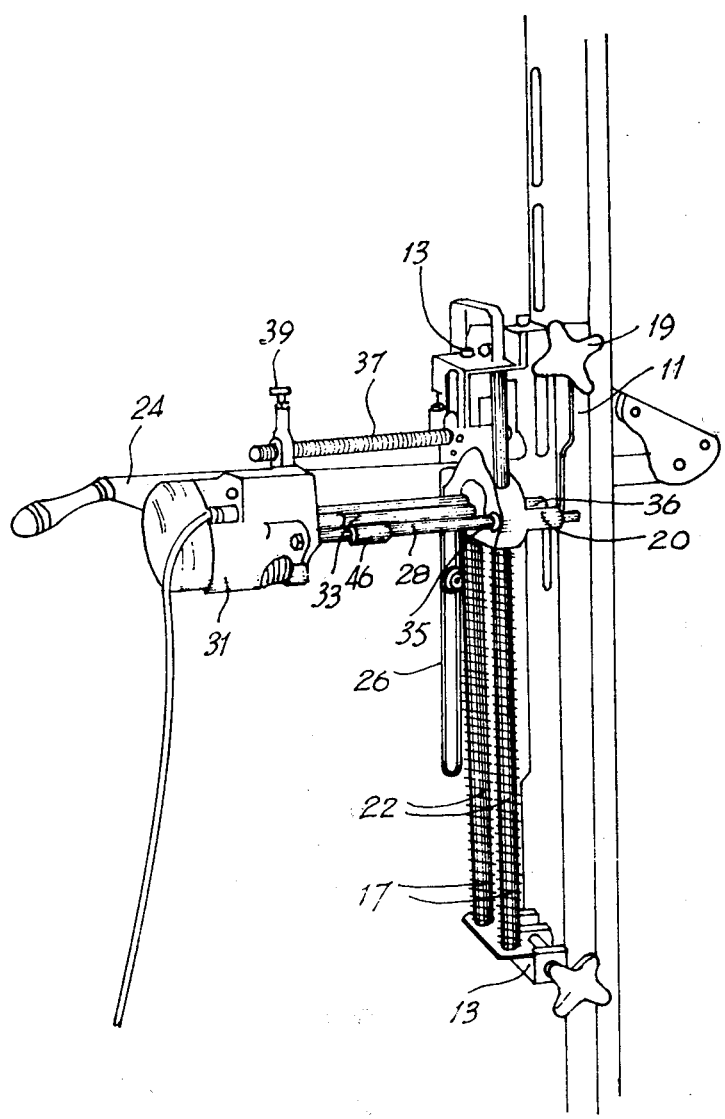
Figure 2:
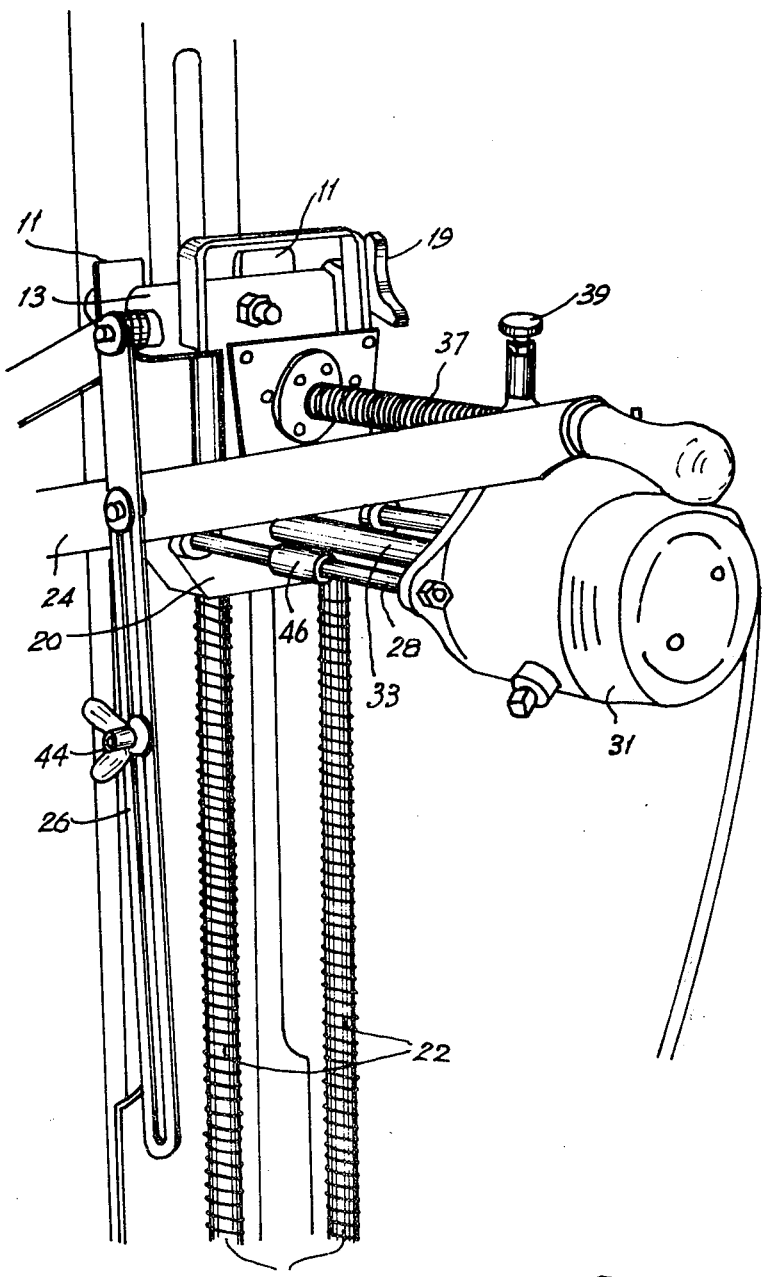
FIG. 2 is an enlarged perspective view of the embodiment from another direction of that of FIG. 1.
Figure 3:
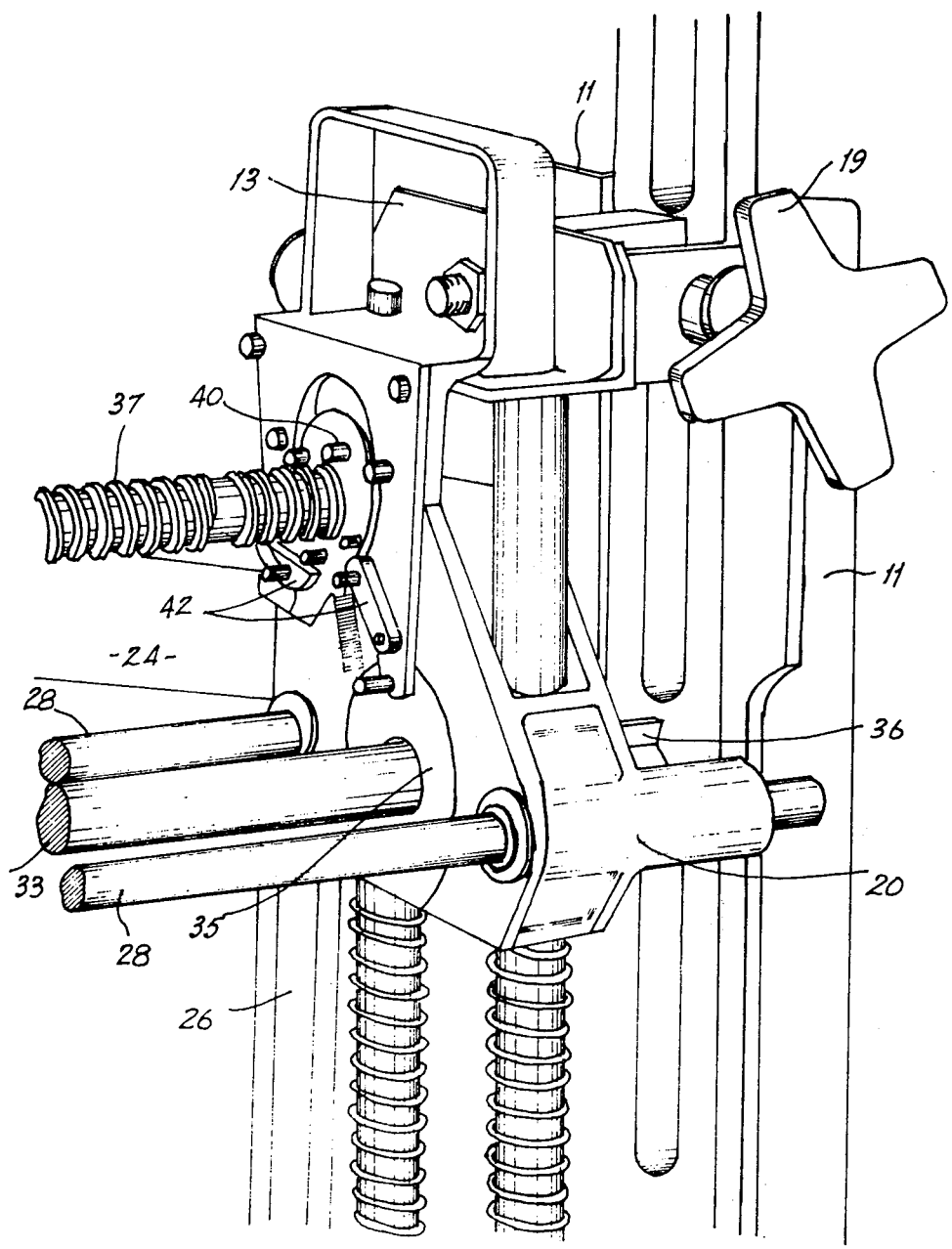
FIG. 3 is an enlarged perspective view of the embodiment showing details of the support and feed means.

The mortising machine of the preferred embodiment comprises a clamping means by which the machine may be mounted to the workpiece. The clamping means consists of two lengths of an angle 11 mounted together in opposed fashion upon a frame. The frame consists of two spaced brackets 13 and 15 having a pair of guide rods 17 mounted between them. Each bracket has the angles 11 mounted to it such that the angles are capable of movement towards and away from each other and a screw thread adjustment means between the angles provide for such movement.

Handles 19 are mounted to the screw thread adjustment to provide for operation of the clamping means.

A support means 20 is slidably mounted upon the guide rods 17 such that it is capable of sliding movement parallel to the clamping means. Springs 22 are located between the lower bracket 15 of the frame and the support means 20 such that the support means is biassed to the uppermost position. An articulated lever 24 is mounted between the upper bracket 13 and the support means 20 to provide a means of moving the support means up and down the guide rods 17.

The articulated lever 24 includes longitudinal links 24a, 24b pivotally mounted end to end. The free end of the upper link 24a is pivotally mounted to the side of the upper bracket 13 of the clamping means. The lower link 24b is pivotally mounted at a point intermediate of its length to the side of the support means 20, and the free end of this lower link is provided with a hand grip. A slotted guide 26 is pivotally mounted at its upper end to the mounting of the upper lever link 24a to the upper bracket and is slidably mounted through a slot to the pivotal mounting of the lower link 24b to the support means 20. A stop 44 may be provided along the length of the slot to limit the degree of slidable movement of the support means in the slot.

Figure 4:
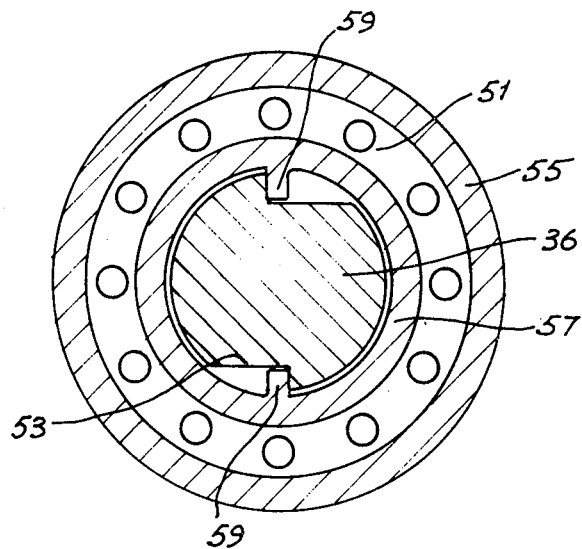
FIG. 4 is a cross-sectional view through the bearing and drive shaft illustrating the mounting of the drive shaft of the motor in the support bearing.

The support means has two rods 28 extending perpendicularly therefrom to which a drive motor 31 is slidably mounted for longitudinal movement thereon. A drive shaft 33 of the motor extends from the motor, to the other side of the support means and is slidably mounted through a bearing housing 35 of the support means. The mounting relationship between the drive shaft 33 and a bearing 51 is shown in FIG. 4. The drive shaft has formed upon it in diametrically opposed relationship two flutes 53 having a right-angled cross-sectional configuration.

The bearing 51 is of the type wherein an outer sleeve 55 is rigidly retained in the bearing housing 35. An inner sleeve 57 has formed upon its inner surface two diametrically opposed lugs 59. The lugs 59 are intended to be engaged by the flutes 53 formed in the drive shaft such that the drive shaft is longitudinally slidable through the bearing 51 but also rotatably engages the inner sleeve 57 to prevent relative rotary movement between the drive shaft and inner sleeve which but for the lugs would occur during the rapid acceleration and deceleration of the drive shaft when the machine is started and/or stopped. The flutes 53 in the drive shaft also assist in the clearing of the debris away from the work area during operation of the machine. The free end of the drive shaft has a rotary cutter 36 mounted thereon.

Figure 5:
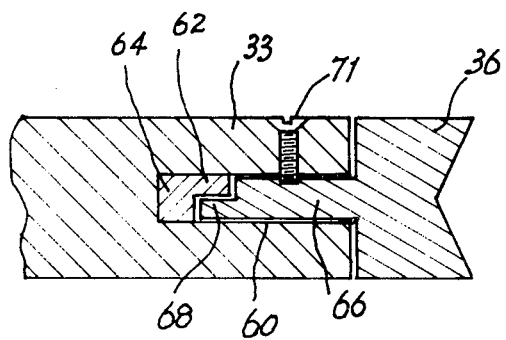
FIG. 5 is a sectional elevation through the end of the drive shaft illustrating the mounting of the cutter thereto.

The cutter must be keyed into the drive shaft to prevent any relative movement between the drive shaft and cutter. An example of one such method is shown in FIG. 5. The drive shaft 33 has a hole 60 formed in its free end the central longitudinal axis of which is coincidental with that of the drive shaft. The end of the hole has formed therein a protrusion 62 which occupies half of the diameter of the holes at the end thereof. Alternatively a plug 64 may be forcibly inserted into the hole having the protrusion 62 formed thereon.

The cutter 36 has mounted upon its rear face a shaft 66 the central longitudinal axis of which corresponds with that of the cutter. The free end of the shaft has formed thereon a protrusion 68 which corresponds to the shape of the space formed in the end of the hole 60 by the protrusion 62. The insertion of the shaft 66 of the cutter in the hole 60 of the drive shaft and the engagement of the protrusions 62 and 68 prevents any relative rotary movement between the cutter 36 and the drive shaft 66. Final locking of the cutter in the drive shaft is ensured by means of a screw 71.

The feed means of the exemplary embodiment includes a screw threaded rod 37 rotatably mounted at one end to the support means 20 and extending perpendicularly therefrom. The rod 37 is rotatably received and passes through a correspondingly sized hole in the casing of the drive motor 31. The casing surrounding the hole which receives the rod 37 has a peg member 39 slidably mounted thereto for entry radially into the hole. The peg member serves in engaging the rod 37. The peg member 39 may be provided with means to permit it to be selectively engaged or retracted from the threaded rod. As a result of engagement of the peg member 39 with the rod 37, rotation of the latter causes the drive motor 31 to move either towards or away from the support member 20. The rod has mounted, adjacent its end mounted in the support member 20, a circular plate 41 having four lugs 40 extending axially therefrom and away from the support means 20. Two spring-loaded pawl members 42 are mounted in opposed relation to each other upon the upper bracket 13 and are located adjacent the lugs 40 on the circular plate 41 when the support means 20 is in its uppermost position. The support means is normally biased by the compression springs 22 to its uppermost position against the upper bracket. As the support means is pushed down one of the pawls engages the lug 40 of the plate 41 to rotate the rod 37 one quarter of a turn. Upon the support means returning to the top of the guide rods 17 the other pawl member engages a lug to rotate the rod a further one quarter of a turn. As a result the cutting head is caused to move further in towards the workpiece in a step by step manner with each downward movement and return of the support means. Where a large diameter cutter is being used one pawl member 42 may be rotated and held out of engagement with the lugs 40 to reduce by half the degree of feed of the drive shaft 33 through the bearing housing 35 and so into the workpiece. Such an action is necessary when using a large cutter to reduce the strains placed upon the machine.

In use the angles 11 of the clamping means are clamped along the edge of the workpiece (e.g. a door) in the region where the mortise is to cut such that they will support the sides of the workpiece during the cutting of the mortise. The stop member 44 is located on the slotted guide 26 according to the desired length of the mortise to be cut. Stops 46 are located on the rods 28 upon which the drive motor is mounted according to the desired depth of the mortise. The drive motor 31 is activated and the lever 24 is used to move the support means up and down the guide rods between the upper bracket 13 and the stop 44 on the slotted guide.

Each time the support means begins a downward movement the cutting head is moved in to the workpiece a little further and as the support means is returned to its upper at rest position it is moved in a further step. When the mortise has been cut to the desired depth the drive motor is deactivated, the peg member 39 is disengaged from the screw threaded rod 37 and the drive motor is pulled back on the rods 28 to remove the cutting head from the workpiece.

Use of the angle clamping members 11 provides many advantages due to the fact that they support each side of the workpiece. As a result a mortise may be cut which passes from the end of the workpiece and which leaves very little material at each side of the mortise. The limits on the depths and lengths of the mortise that may be cut are also increased. By means of the support means the drive shaft is held to a true centre line position and cannot wander from that position.

Therefore it is possible to use a much larger cutter than has been possible previously and to produce a much more accurately positioned mortise than has been possible previously. One machine constructed according to the embodiment which was fully portable, was able to produce a mortise having maximum depth of 5 inches, maximum width of 1½ and maximum length of 14 inches.

We claim:
1. A mortising machine comprising: a clamping means whereby the machine may be mounted upon a workpiece; a drive motor mounted such that its drive shaft is substantially perpendicular to the working face of the workpiece; a cutting head mounted to the end of said shaft adjacent the workface; a means to support said shaft between said motor and said head, said support means also providing support for said motor, said shaft and said motor being slidably mounted to said support means, to be movable perpendicular to the workface; feeding means between said support means and said motor such that said shaft can be fed through said support means; and a guide mounted to said clamping means, to which said support means is slidably mounted, such that said support means together with said shaft are capable of movement on said guide perpendicular to that produced by said feeding means, wherein the latter includes a screw-threaded rod rotatably mounted to said support means and constituting a threaded engagement by a housing of said motor, the end of said rod mounted to said support means having a lugged formation thereon, at least one spring-loaded pawl mounted on one of said clamping means and said guide such that, said said lugged formation is moved past said pawl in one particular direction, said rod is caused to rotate because of the engagement of said pawl with said lugged formation, and when the latter is moved in the opposite direction, there is only resilient engagement of said pawl with said lugged formation, with the absence of rotation of said rod.

2. The mortising machine as defined in claim 1, wherein said clamping means includes two clamping members to engage each side of the workpiece and provide support therefor in the region of the proposed mortise.

3. The mortising machine as defined in claim 1, further comprising a lever linkage between said clamping means and said support means such that by means of said lever linkage, said support means may be moved the length of said guides.

4. The mortising machine as defined in claim 1, further comprising compression springs mounted on said guide between said support means and the lower end of said guide such that said support means is biased to the uppermost position.

5. The mortising machine as defined in claim 1, wherein said threaded engagement between the housing and the rod is selective.

6. The mortising machine as defined in claim 1, wherein said lugged formation is a circular plate having lugs circumferentially spaced therearound.

7. The mortising machine as defined in claim 1, wherein a support for said shaft in said support means includes a roller bearing, an inner sleeve of which has formed thereon a set of inwardly projectiong lugs which engage in a corresponding set of longitudinal flutes formed in said shaft to provide for sliding movement of the latter through said sleeve but to cause said sleeve to rotate with said shaft.

* * * * *